(12) United States Patent
Madsen et al.

(10) Patent No.: US 7,542,686 B2
(45) Date of Patent: Jun. 2, 2009

(54) RESET FREE DEVICES

(75) Inventors: Christi Kay Madsen, South Plainfield, NJ (US); Albert Georg Peter Oswald, Dresden (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 656 days.

(21) Appl. No.: 10/930,248

(22) Filed: Aug. 31, 2004

(65) Prior Publication Data

US 2005/0185971 A1 Aug. 25, 2005

Related U.S. Application Data

(63) Continuation-in-part of application No. 10/783,516, filed on Feb. 20, 2004, now abandoned.

(51) Int. Cl.
*H04B 10/06* (2006.01)
*H04B 10/18* (2006.01)

(52) U.S. Cl. .................................. 398/208; 398/214
(58) Field of Classification Search .................. None
See application file for complete search history.

(56) References Cited

U.S. PATENT DOCUMENTS

| | | | | |
|---|---|---|---|---|
| 4,384,760 A | * | 5/1983 | Alferness | 385/11 |
| 4,832,431 A | * | 5/1989 | Nolting et al. | 385/2 |
| 4,966,431 A | * | 10/1990 | Heismann | 385/11 |
| 5,212,743 A | * | 5/1993 | Heismann | 385/11 |
| 5,828,796 A | * | 10/1998 | Han et al. | 385/9 |
| 6,384,956 B1 | * | 5/2002 | Shieh | 359/256 |
| 6,493,473 B1 | * | 12/2002 | Wooten | 385/11 |
| 6,560,014 B1 | * | 5/2003 | Trzecieski et al. | 359/484 |
| 6,714,706 B2 | * | 3/2004 | Kambe | 385/41 |

OTHER PUBLICATIONS

Heismann, F. et al. "Automatic polarisation demultiplexer for polarisation-multiplexed transmission systems." Electronics Letters, vol. 29, No. 22, Oct. 28, 1993: 1965-1966.*
Madsen, C.K. et al. "Reset-free integrated polarization controller using phase shifters." IEEE Journal of Selected Topics in Quantum Electronics, vol. 11, No. 2, Mar./Apr. 2005: 431-438.*
Moller, L. "WDM polarization controller in PLC technology." IEEE Photonics Technology Letters, vol. 13, No. 6, Jun. 2001: 585-587.*
Saida, T. et al. "Planar lightwave circuit polarization mode dispersion compensator." 27th European Conference on Optical Communication, 2001. ECOC '01: 10-11, vol. 1.*
Heismann, F "Analysis of a Reset-Free Polarization Controller for Fast Automatic . . . " J of Lightwave Technology, 12(4) 1994. pp. 690-699.

(Continued)

*Primary Examiner*—Kenneth N Vanderpuye
*Assistant Examiner*—David S Kim

(57) ABSTRACT

It is possible to perform reset free operation in devices having polarization state controllers by employing specific sequences of phase shifters and couplers. In particular, sequences comprising a coupler/phase shifter/coupler or phase shifter/coupler/phase shifter formed in, for example, a semiconductor substrate, e.g. silicon substrate, is used to form the polarization state controller. For example, a sequence functions as a quarter wave plate equivalent while two combined sequences function as a half wave plate. Moreover, sequences functioning as wave plates more general than quarter wave plates are advantageously employed. Control of the couplers and phase shifters of these sequences yield reset free or reset free, fully deterministic operation.

17 Claims, 6 Drawing Sheets

OTHER PUBLICATIONS

Saida, T. et.al. "Planar Lightwave Circuit Polarization-Mode Dispersion Compensator." IEEE Photonics Tech Letters, 14(4), 2002. pp. 507-509.

Soldano, L.B. et.al. "Optical Multi-Mode Interference Devices Based on Self-Imaging . . . " J of Lightwave Technology, 13(4), 1995. pp. 615-627.

Madsen & Zhao. Optical Fiber Design and Analysis. NY: Wiley, 1999. Chapter 4, Multi-Stage MA Architectures, pp. 165-171.

Martinelli, M. et.al. "Endless Polarization Control Algorithm Using Adjustable . . . " J of Lightwave Technology, 21(9), 2003 pp. 2089-2096.

\* cited by examiner

FIRST QUARTER-WAVE PLATE

HALF-WAVE PLATE

SECOND QUARTER-WAVE PLATE

RESET FREE DEVICES

CROSS REFERENCE TO OTHER APPLICATIONS

This application is a continuation-in-part of U.S. patent application Ser. No. 10/783,516 filed Feb. 20, 2004 now abandoned which is hereby incorporated by reference in its entirety.

TECHNICAL FIELD

This invention relates to optical communication and in particular optical communication involving polarization mode effects.

BACKGROUND OF THE INVENTION

In optical communication systems and in particular in long haul optical communications systems, dispersion effects, if uncorrected, cause significant bit error rates. Thus, a large variety of approaches have been developed to deal with such dispersion. (See *Optical Fiber Telecommunications* 111A, Chapters 6 and 7, Ed. by I. P. Kaminow and T. L. Koch, Academic Press, 1997 for a general description of dispersion effects in optical communication systems.) These approaches for correcting dispersion have been effective and as a result have allowed an increased rate of information transmission as well as an increased distance between points at which the signal is reshaped. However, as transmission pulse rates become faster and/or as distances between reshaping become greater, new effects resulting in dispersion become significant. In particular, at data repetition rates above about 40 Gb/s and/or signal reshaping spaces greater than about 500 km polarization mode dispersion begins to present a concern.

Generally light launched for long haul communications on an optical medium such as a laser light from a distributed feedback laser, contains essentially only one polarization mode. Nevertheless coupling in the fiber soon produces two polarization modes with the injected light power divided between these two modes. Since the two modes do not travel at the same rate through the optical medium, the information contained in one polarization mode becomes spread in time relative to the other mode as it traverses the optical medium. Thus polarization mode dispersion adds to other undesirable dispersive effects.

For most optical media the difference in traversal rate between the two polarization modes, commonly denominated TE and TM, is relatively small—on the order of a few picoseconds. However, as previously discussed, at repetition rates approaching about 40 Gb/s or reshaping distances approaching about 500 km, even the relatively small difference between the traversal rates of the two polarization modes becomes meaningful. Thus, an increased interest in correcting polarization mode dispersion has been generated.

Before compensating for polarization mode dispersion, the polarization state of the incoming optical signal is desirably brought to the state of polarization that is advantageous for correction by the device being employed. Numerous approaches have been developed in optics to change the state of polarization in an incoming optical wave into a second desired state of polarization. For example, the sequence of a first quarter wave plate, a half wave plate, and a second quarter wave plate intercepting the light is employable to produce the transition from the input polarization state to a second desired output state. (See Heismann, *Journal of Lightwave Technology*, 12 (4), 696 (1994), which is hereby incorporated by reference in its entirety, for a description of this optical plate arrangement.) Each plate is rotated sufficiently around an axis through the center of and perpendicular to its major surface to achieve the desired conversion. For example, as shown schematically in FIG. 1, the three plates as indicated are rotated to an appropriate degree to produce the desired conversion. (The necessary degree of rotation for a given input state and desired output state is obtained as described in Heismann, supra. By convention, the rotation angle of the first quarter wave plate is denominated $\alpha/2$, the rotation of a half wave plate is denominated $\gamma/2$, and the rotation of the third wave plate denominated $\beta/2$.) However, the mechanical rotation of wave plates in response to an incoming signal having rapidly changing polarization states is not a practical approach to providing a desired output polarization state for dispersion correction.

A variety of devices that are the equivalent to the previously described three wave plate device but whose effect on polarization state is controlled by manipulation of an electrical signal have been proposed. For example, as discussed by Heismann, supra, a device equivalent to the three wave plate configuration is producible in a lithium niobate wafer. This device has the attribute of relatively fast conversion from one polarization state to another—speeds reported to be on the order of 4900 rad/s accompanying reset free polarization. (Reset free involves the operation of a device to convert a communication signal with varying incoming polarization states to desired output polarization states without abruptly changing the device control signal even during extremes in operation, such as when the control signal is operated at the physical limits of the device. Resets are typically implemented by introducing additional redundant components into the device that are only switched on during times when the reset occurs but are otherwise idle. During the reset, the incoming and outgoing polarization states are necessarily static. This pause is problematic in situations when the controller must track polarization changes occurring at fast speed.) Although such lithium niobate devices are indeed reset free and have conversion speeds significantly faster than mechanical wave plate configurations, they, nevertheless, rely on fabrication by techniques less adapted for mass production than that typically used in integrated circuit manufacture.

In an attempt to reduce cost and increase speed, polarization controllers for use in polarization mode dispersion compensation have been proposed to be fabricated as a silica based planar lightguide circuit. (See T. Saida et. al. *IEEE Photonics Technology Letters*, 14(4), 507 (2002)). Fabrication of devices such as tunable couplers, phase shifters, and polarization beam splitters are well-known as discussed in *Optical Fiber Telecommunications* IIIB, Ed. By Kaminow and Koch, Chapter 8 by Li and Henry. The phase shifters and tunable couplers produced using a substrate having silicon and silicon dioxide regions are controlled by electrodes configured to produce localized heating in appropriate device regions. The degree that the phase is shifted or the extent of coupling between light in two individual waveguides depends on the degree of heating. Clearly, material properties limit the extent of heating that is acceptable. Since fabrication of individual components forming the polarization controller is well known and fabrication in a silicon/silica based medium is relatively inexpensive, such device has the potential for being significantly easier to fabricate than a device based on lithium niobate. Additionally, the speed of such device, as demonstrated by Saida, et. al, is substantially faster than manual manipulation of wave plates, although improvement would be desirable for optical communication. Nevertheless, these silicon/silica based devices are not reset free, contain redundant components to convert polarization states and suffer polarization delays associated with the reset. To mitigate such polarization delays, Saida, et. al. supra has suggested use of a dithering approach for controlling the device. In such an approach the control signal is randomly oscillated until a chosen parameter such as output signal strength is improved to a desired level. However, dithering relies on an interactive feedback approach from an initial control system setting. Such approach is less desirable in demanding operations since reaching the desired control signal is slowed by the iterative process.

There is therefore a need for a device that 1) is reset free in the sense that it is possible to track changes in the incoming and outgoing polarization states with corresponding changes in the control signal without exceeding the physical range limits of the device, 2) is based on a material system such as silicon/silica which provides conventional fabrication, and 3) compensates polarization mode dispersion as part of, for example, a polarization mode dispersion compensator. In an even more desirable configuration, the device would be not only reset free, but also fully deterministic. (Fully deterministic in this context means that the control parameter settings for the device are not dependent on dithering so that the desired conversion from input to output state of a wave plate is achievable during operation to an accuracy of 5 percent or better without an iterative process. For example, the desirable accuracy is achieved by setting the control signal based on a calculation from analytical equations using information about the desired input and output polarization state.)

SUMMARY OF THE INVENTION

By an appropriate choice of device components and an appropriate control protocol, it is possible to produce and operate a polarization mode dispersion compensator or other optical signal processing device having a reset free and, in many embodiments, fully deterministic polarization controller formed in a semiconductor material substrate such as a silicon substrate. (Reset free for the purposes of the invention is the conversion of an input signal to desired output signal without using redundant planarization control elements such as phase shifters and/or couplers. A component in an optical polarization conversion circuit is redundant if an incoming constant polarization signal is convertible in the optical conversion circuit without the component but continuous conversion as the relative phase difference between the two polarizations of the incoming signal monotonically increases from 0 to 10 π requires at least intermittent use of this component.) The device, because it is formed using a semiconductor based substrate, has the advantage of established fabrication procedures, is reset free and thus is fast enough to operate on input signals having typical polarization state variation encountered in optical communication.

The device includes tunable couplers and tunable phase shifters, e.g. thermo-optic couplers and thermo-optic phase shifters. (The invention is not limited to a particular kind of phase shifter or coupler and a variety of such components e.g. free carrier plasma, electro-optic phase shifters and/or multimode interference couplers, *Journal of Lightwave Technology* 13(4), 615 (1995), are employable. However in one embodiment, thermo-optic phase shifters and couplers are advantageously employed. Thus for pedagogic purposes only, the remainder of the description is in terms of such thermo-optic components.)

Both thermo-optic couplers and thermo-optic shifters employ electrodes to produce the heating required to control respectively the degree of phase shift and the degree of coupling. The desired change from an input polarization state to a desired output polarization state is achieved using as building blocks two types of component sequences. Specifically, in a first type sequence (denominated in the context of this invention Type I), a phase shifter, then a coupler, and then a phase shifter are used sequentially. In a second type sequence (Type II), a coupler, a phase shifter, and then a coupler are employed sequentially. The sequences are used to produce results equivalent to wave plates of chosen characteristics. For example, in one specific embodiment, the sequences are used in series to produce a result equivalent to a quarter wave plate and a half wave plate (the latter produced by two quarter wave plates corresponding to two sequences in a row operated as identical quarter wave plates.) Thus the sequences are useful to produce a series of wave plates that are chosen to produce a conversion of an input polarization state to a desired output polarization state. To continue the example, three sequences (e.g. two of the same type sequence and one of another type sequence) in series are operated as two wave plates such that the first sequence functions as a quarter wave plate equivalent and the second two together as a half wave plate equivalent to ensure that the output signal has a constant desired polarization state. Similarly, by employing four wave plates such as produced by four sequences in series (two sequences operating as quarter wave plate equivalents separated by two sequences operating together as a half wave plate), any output polarization state is producible. The operation of an individual Type I sequence to produce a quarter wave plate α/2 includes controlling the heaters in conformance with the equation:

$$\theta=\arc\sin(2^{-1/2}\sin\alpha); \phi_0=\phi_1=\arc\tan(\cos\alpha) \quad (1)$$

Where $\theta$ is the coupling strength for the coupler, and $\phi_0$ and $\phi_1$ are the phase shifts for the shifter before and after the coupler, respectively.

For the example of a Type II sequence, the electrodes are controlled in conformance with the equation:

$$\phi/2=\arc\sin[2^{-1/2}\cos\alpha]; \theta_0\theta_1=\tfrac{1}{2}\arc\tan(\sin\alpha) \quad (2)$$

where $\phi$ is the phase shift for the shifter, and $\theta_0$ and $\theta_1$ are the coupling strengths for the couplers before and after the shifter, respectively.

As follows from these equations, each individual quarter wave plate allows a reset free implementation using Type I and Type II sequences. A series of three or four (depending on the application) Type I or Type II sequences are operated by determining the parameters according to Heismann, supra, that convert a specific input polarization to a desired output polarization and then, according to equations (1) and (2), the parameters are determined for the phase shifters and couplers in the Type I and/or Type II sequences operating as the corresponding quarter wave plates. The control of such a device is reset free but not necessarily fully deterministic.

A series of Type I and Type II sequences is not only operable as the previously described embodiment involving quarter and half wave plates (the latter formed from quarter wave plates), but also as the equivalent of wave plates more general than just quarter and half wave plates. (These wave plates include all wave plates including quarter wave plates but not half wave plates, and in the context of this invention are denominated general wave plates.) By employing a general wave plate configuration reset free together with fully deterministic operation is achievable. Specifically, it is possible to generalize equations (1) and (2) for such general wave plates and to replace a configuration including quarter and half wave plates by a series of sequences equivalent to general wave plates with a resulting fully deterministic, reset free control signal operation. In this way, to convert any incoming polarization state into a given, fixed outgoing polarization state, two sequences of Type I and/or Type II operated in a deterministic, reset free fashion are employable. Similarly, to convert any incoming polarization state into any outgoing polarization state, three sequences of Type I and/or Type II operated in a deterministic, reset free fashion are used. Thus the attributes of a reset free, fully deterministic operation are achievable with a semiconductor material based, responsive device in a configuration that is equivalent to optical wave plate configurations.

DETAILED DESCRIPTION

The invention allows production and operation of a polarization state controller that is reset free and even fully deterministic reset free, and that is capable of being formed using semiconductor device fabrication techniques such as those involving silicon and silicon dioxide. The output of such controller is further processed to achieve more complex optical signal processing such as polarization mode dispersion compensation. Generally, the signal is subjected first to a polarization beam splitter to divide the signal into its two polarization components. Then one of the two resulting output signals is subjected to a fixed half wave plate producing a 90 degree rotation. Accordingly, the incoming signal is prepared for the inventive device by splitting it into separate polarization components and rotating one component 90 degrees relative to the other. (Polarization beam splitters and fixed half wave plates such as formed from trenches filled with polyimide are well known. See Saida supra.) The two polarization components are introduced into the sequences, for example, at 57 and 58, respectively, in FIG. 5. Similarly, after treatment of the signal with the inventive device and if desired with other devices, such as a time delay device, the polarization components are generally subjected to the inverse operation, i.e. the component previously rotated 90 degrees is rotated another 90 degrees and the components are again combined.

Figure 1:
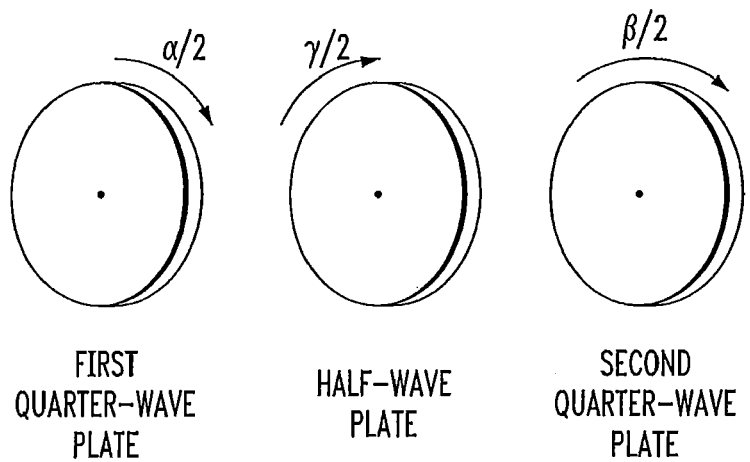
FIG. 1 is illustrative of wave plates employed to affect polarization states.
Figure 2:
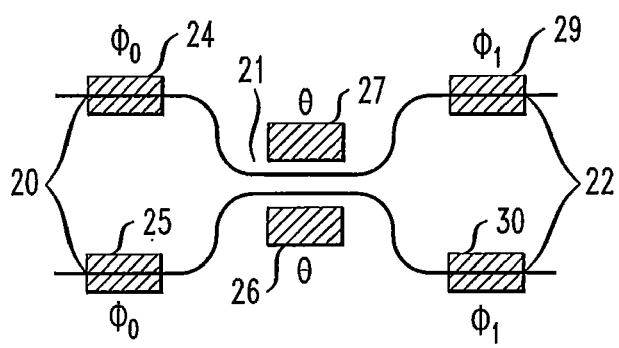
FIGS. 2 and 3 are illustrative of Type I and Type II sequences.
Figure 7:
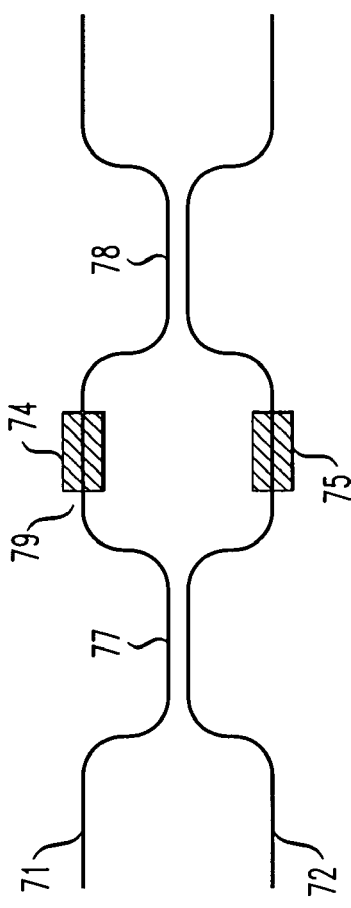
FIG. 7 is illustrative of one embodiment of a coupler component.

The inventive reset free processing devices involve use of polarization controllers composed of building blocks where each building block includes a specific sequence of variable phase shifters and variable directional couplers. In a Type I sequence shown in FIG. 2, the components used in sequence include a variable phase shifter 20, a variable coupler 21, and a second variable phase shifter 22. The variable coupler need not be formed from a single component. For example, a variable coupler is producible using the configuration of FIG. 7. The waveguides, 71 and 72, form a fixed coupler 77 (coupling typically a fixed amount of power in the range 30 to 70 percent) a variable phase shifter 79 having electrodes 74 and 75 to control θ for the entire coupler equivalent and a second fixed coupler 78 complementary to coupler 77. The relationship between the phase shift induced by electrodes 75 and 74 and the θ for the entire variable coupler equivalent is given in Madsen and Zhao, Optical Filter Design and Analysis, Chapter 4, pages 165 to 171, New York, Wiley (1999) which is hereby incorporated in its entirety by reference. (For convenience, the entire set of components used to produce the variable coupler is denominated a coupler and is shown in the Figures by the representation shown in association with electrodes 42 and 43 in FIG. 4 or at 33 in FIG. 3.) Electrodes 24 and 25 in FIG. 2 control the first phase shifter, electrodes 26 and 27 control the coupler, and electrodes 29 and 30 control the second phase shifter. Each electrode is employed to heat the silica region of the device as is conventional with thermo-optic devices described in Kaminow and Koch, Chapter 8 supra. To produce positive values of $\phi_0$, θ, and $\phi_1$, electrodes 24, 27, and 29 are employed respectively. Correspondingly, to produce negative values of $\phi_0$, θ, and $\phi_1$, electrodes 25, 26 and 30, respectively are employed. The necessary heating and thus the necessary current imparted to the various electrodes to produce a desired value to φ and θ is easily determined using a control sample.

Figure 3:
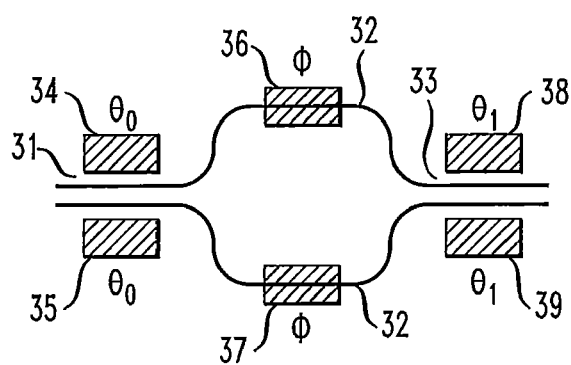

A Type II component sequence useful as a building block is shown in FIG. 3. The components used sequentially include a coupler 31, a phase shifter 32, and a second coupler 33. Again, electrodes 34, 35, 36, 37, 38, and 39 are used to produce the desired values for θ and φ where electrodes 34, 36, and 38 are used to produce positive values while electrodes 35, 37, and 39 are employed to produce negative values.

Figure 8:
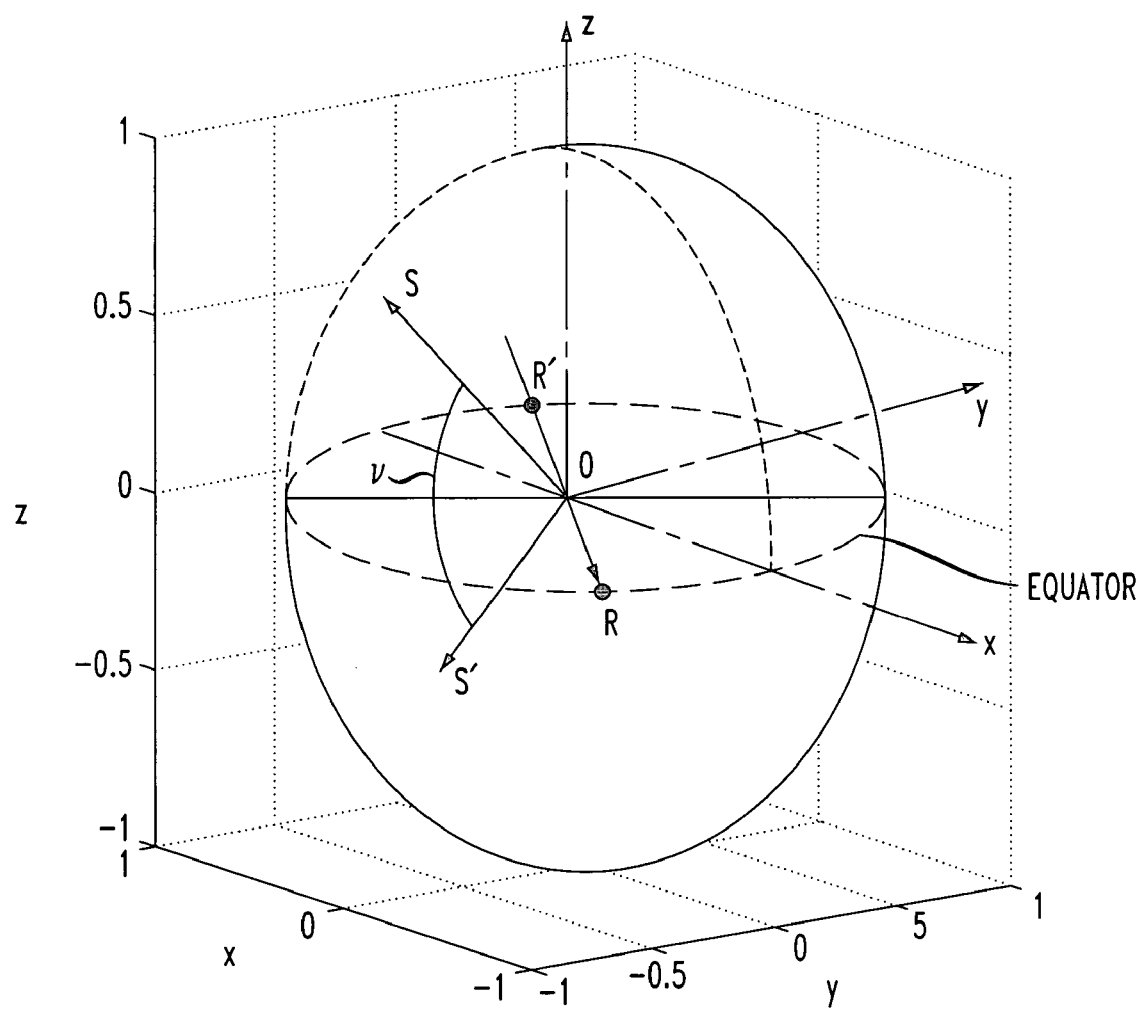
FIGS. 8, 9 and 10 are illustrative of the effects involved with general wave plates.

It is possible to employ the invention to 1) convert a series of arbitrary incoming polarization states to one specific output polarization state or, alternatively 2) to convert arbitrary incoming polarization states to varying output polarization states. The number of sequences employed to accomplish approach (1) "arbitrary to fixed" differs from the number employed to accomplish approach (2) "arbitrary to varying". For an "arbitrary to fixed" conversion, sufficient sequences are employed to produce two wave plates; for the "arbitrary to varying" approach, sufficient sequences are employed to produce three wave plates. Generally, one sequence is sufficient to produce one wave plate unless the wave plate desired is a half wave plate (or within 2 degrees of a half wave plate). For a half wave plate or one within 2 degrees of a half wave plate (collectively denominated half wave plates), two sequences are employed. Each wave plate is characterized with reference to a sphere with a unit radius such as shown in FIG. 8. This sphere is a mapping of the polarization states of a light wave onto the surface of a sphere. The evolution of these states as the light wave propagates through, e.g., a non-absorbing, birefringent waveguide, is conveniently represented by trajectories on the surface of the sphere. Points on the equator represent linearly polarized states, such that the point representing 0° (pure TE) is diametrically opposite the point representing 90° (pure TM). The poles represent circular polarization, and all other points correspond to elliptically polarized states. The equator of the sphere is coplanar with the x-y plane. The rotation axis (first degree of freedom) of the wave plate goes from a first point R' on the equator to a second point R on the equator through the center O of the sphere. (Thus, to define the rotation axis, it is sufficient to know the x-coordinate denoted by $R_x$ and the y-coordinate denoted by $R_y$ of the point R whose z-coordinate $R_z$ vanishes, i.e., $R_z=0$.) The second degree of freedom of the wave plate is defined by the action of the wave plate on a polarization state. A polarization state is represented by a unit length polarization vector emanating from the center of the sphere and ending at a point S on the sphere. A wave plate rotates any polarization vector by the same angle ν in a counter clockwise direction around its rotation axis. (In FIG. 8, this rotation is depicted by the movement of the polarization vector with endpoint S into the polarization vector with endpoint S'.) That is, the wave plate is defined by a first degree of freedom—the position of R determining the rotation axis—and a second degree of freedom—the angle ν by which a polarization vector is rotated around the axis defined by R. The general wave plates used are characterized by an angle ν between −178° and +178° exclusive. (Thus half wave plates are not general wave plates.)

Figure 9:
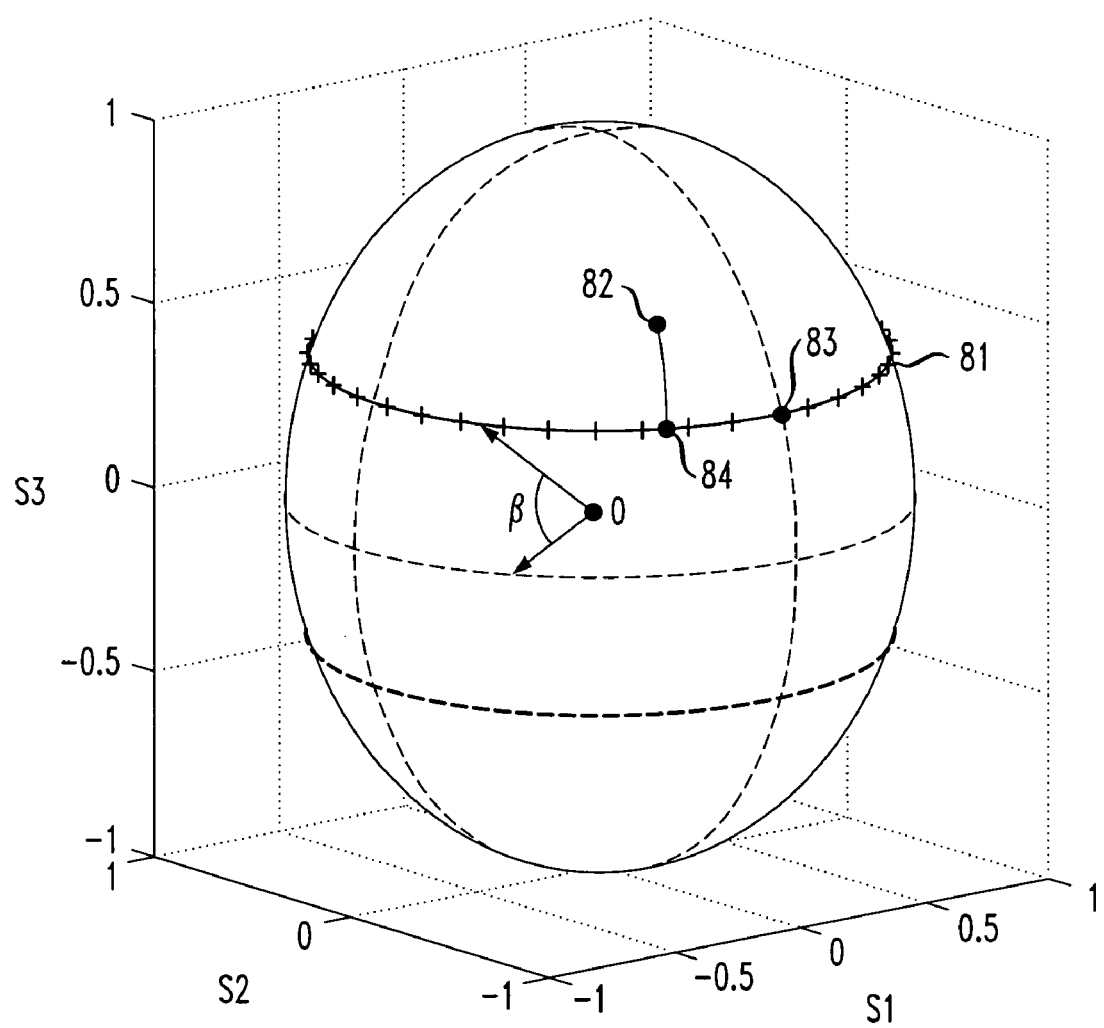

As discussed, for transformation of an arbitrary incoming polarization vector to varying output polarization vectors, three general wave plates are employed. The first wave plate transforms the incoming polarization vector ending at point $S_{in}$ to a vector that ends at point $S_{d1}$ on a designated circle C which is parallel to the x-y plane. The circle C is shown in FIG. 9 at 81, while examples of positions $S_{in}$ and $S_{d1}$ are shown as 82 and 83, respectively. Advantageously $S_{d1}$ should be chosen as close as possible to $T_{in}$, 84 the point on the circle C which is closest to $S_{in}$ but the position $S_{d1}$ depends also on the change of the incoming polarization vector $S_{in}$ relative to its position at the last input value. (The last input value is the input polarization state used in the previous control step, i.e., for determining the control parameters of the device existing at the time of beginning to process $S_{in}$.) The position of the circle C is characterized by the angle β with the x-y plane which is larger than 0° but below 90° or between 0° and −90°. However, to match the performance properties of present components it is generally advantageous to choose β between 15 degrees and 30 degrees or between −15 and −30 degrees.

The exact position of $S_{d1}$ is dependent in part on the position of $S'_{in}$ of the input polarization state at the last input value and the transformation position $S'_{d1}$ of $S'_{in}$ onto circle C. The point $S_{d1}$ on the circle C associated with $S_{in}$ is chosen such that $S_{d1}=T_{in}$ unless the movement from $S'_{d1}$ (the previous location of $S_{d1}$) to $T_{in}$ is excessive. A movement is considered excessive if the shortest distance on the sphere between $S'_{d1}$ and $T_{in}$ exceeds the distance on the sphere between the two consecutive incoming polarization states, $S'_{in}$ and $S_{in}$, multiplied by a proportionality constant $C_{in}>1$. Thus the input vector $S_{in}$ is transformed from $S'_{d1}$ towards $T_{in}$ along the circle C until further progression results in an excessive movement or until $T_{in}$ is reached, whichever occurs first. This final point is the $S_{d1}$ corresponding to $S_{in}$. For advantageous performance and present device properties, choices for the constant $C_{in}$ in the range from 2 to 5 are preferred.

Figure 10:
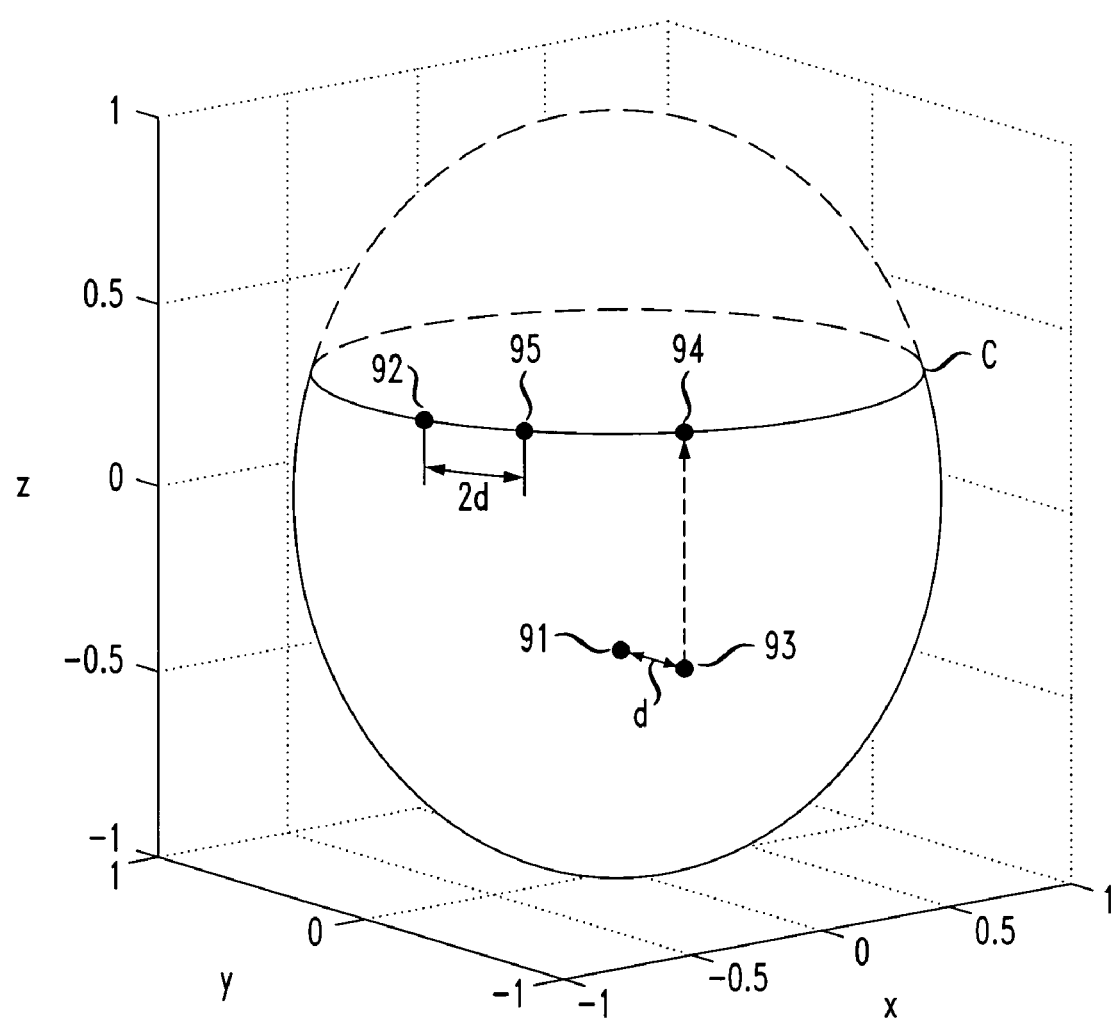

To exemplify, in FIG. 10 an incoming polarization vector from the previous stage of the control process, is $S'_{in}$, 91, with corresponding $S'_{d1}$, 92, and the current incoming polarization vector is $S_{in}$, 93. Corresponding to $S_{in}$ is its closest point $T_{in}$, 94, on the circle which is an excessive distance from 92 compared with the shortest distance on the sphere between 91 and 93 (for simplicity of visualization, $C_{in}$ is chosen equal to 2). Thus, to find the transformation point $S_{d1}$, 95 in this example, $S_{d1}$ is not set to $T_{in}$ but instead is transformed, as previously discussed, along C towards $T_{in}$ from $S'_{d1}$ a distance of $C_{in}$ times the shortest positive distance between $S_{in}$ and $S'_{in}$ along the sphere. (The term transformation along the circle C is not intended to fix the actual transformation path but only to be descriptive. The endpoint of the transformation not the path is the significant factor.)

The second wave plate is chosen to move the terminus of the vector resulting from the first transformation to a second point $S_{d2}$ on the same circle C. The location of $S_{d2}$ depends on the outgoing polarization state $S_{out}$ and is determined by a procedure similar to the one for $S_{d1}$. That is, if $T_{out}$ is the closest point to $S_{out}$ on the circle C, then $S_{d2}=T_{out}$, unless the distance between $T_{out}$ and the previous $S'_{d2}$ on the circle C exceeds a constant $C_{out}$ times the shortest positive distance on the sphere between the two last consecutive outgoing polarization states $S'_{out}$ and $S_{out}$. It is advantageous, but not essential to choose $C_{out}=C_{in}$. Generally for present device properties $C_{out}$ is preferably in the range 2 to 5.

Finally, the third wave plate is employed to transform the vector output from the second wave plate to the desired output polarization state. The defining degrees of freedom R (characterized by the two coordinates $R_x$ and $R_y$) and ν for each of the transformations corresponding to the first, second, and third general wave plates are calculated using the same formalism. A general wave plate transforms a polarization vector ending at S into a polarization vector ending at S'. Thus in terms of the previous discussion, for the first wave plate transformation $S=S_{in}$ and $S'=S_{d1}$, for the second wave plate $S=S_{d1}$ and $S'=S_{d2}$, and for the third wave plate $S=S_{d2}$ and $S'=S_{out}$). For pedagogic purposes it is convenient to identify the points S, S', and R on the unit sphere with the corresponding coordinate vectors of unit length. Then R is defined as the unit vector in the x-y plane that is at equal distance from S and S'. For situations where the circle C and the constants $C_{in}$ and $C_{out}$ are chosen as discussed above there are two such vectors R and −R with this property. (Exceptional situations where any vector in the x-y plane is at the same distance from S and S' only occur when S and S' coincide and both belong to the circle C, or if S and S' are symmetric about the x-y plane to an inversion operation. In these exceptional situations R is further required to be orthogonal to the vector ending at S.) Accordingly a unique pair of vectors R and −R are determined, and either R or −R is chosen as the rotation axis of the underlying wave plate transformation. After R is fixed, the angle ν is found from the formula $$\cos\nu = \frac{Q * Q'}{|Q| * |Q'|}, Q = S - (S*R)R, Q' = S' - (S'*R)R$$

where * represents a direct product of vectors, and |Q| Is the length of vector Q. The sign of ν is chosen in such a manner that a counter clockwise rotation of S into S' around the axis given by R indeed corresponds to rotation around R by an angle ν. From the parameters $R=(R_x, R_y, 0)$ and ν for a desired general wave plate transformation, the device parameters φ and θ for Type I and Type II sequences are as follows:

For a Type I sequence $\Theta=2$ arc sin $(R_y \sin(\nu))$, $\Phi_0=\Phi_1=$arc tan $(R_x \tan(\nu/2))$, (3)

while for a Type II sequence $\Phi=2$ arc sin $(R_x \sin(\nu/2))$, $\Theta_0=\Theta_1=\frac{1}{2}$ arc tan $(R_y \tan(\nu/2))$. (4)

For the special case of quarter wave plates, where ν=π/2, equations (3) and (4) reduce to equations (1) and (2), respectively, and thus generalize the latter.

If the transformation between an arbitrary incoming polarization state to a fixed output polarization state is desired, then the wave plate sequence described above is truncated to two wave plates provided the fixed output polarization state belongs to the circle C. If it does not belong to the circle C the device is completed, using components forming a fixed wave plate (an additional non-variable sequence) to transform from an arbitrarily fixed auxiliary polarization state $S'_{out}$ located on the circle C to the given fixed outgoing polarization state $S_{out}$.

(The fixed sequence—Type I or Type II—is not considered part of the sequence series since it undergoes no adjustment of parameters.)

Figure 4:
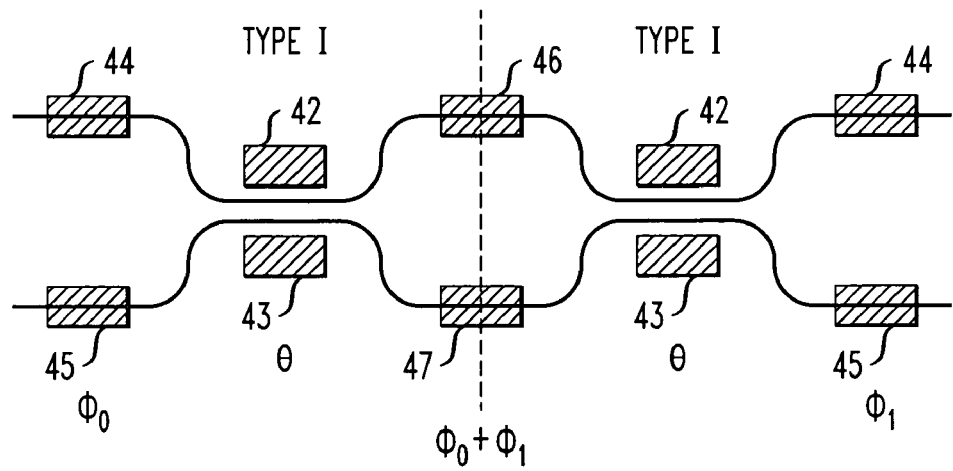
FIGS. 4 through 6 are illustrative of combinations of Type I and Type II sequences.

By using general wave plates, i.e. wave plates other than half wave plates, not only is reset free operation achievable but also deterministic control is achievable. By using a quarter wave plate followed by a half wave plate followed by a quarter wave plate, reset free operation is achievable, but the further advantage of using general wave plate transformation is typically not obtained. Nevertheless, for pedagogic purposes to relate component configuration to required wave plate characteristics for all wave plates, it is advantageous to provide a further description of the quarter, half, quarter wave plate series. In all configurations other than a half wave plate either a Type I or a Type II sequence is configured to function as a wave plate equivalent. By employing two sequences in series and operating them as identical quarter wave plates, it is possible to form a half wave plate equivalent. Thus, as shown in FIG. 4 with two Type I sequences, electrodes 42, are electrically connected and are used to produce positive values for θ while electrically connected electrodes 43 are used to produce negative values of θ. Similarly, electrically connected electrodes 44 are used to produce positive values of $\phi_0$, electrically connected electrodes 45 are used for negative $\Phi_0$, while electrodes 46 and 47 are used to produce positive and negative values respectively of $\phi_0 + \phi_1$. (It should be noted the $\phi_0$ and $\phi_1$ for half wave plates do not correspond strictly to couplers before and after the first phase shifter in the configuration since two sequences are employed. Because the sequences are operated with $\phi_1 = \phi_0$, the lack of the correspondence does not matter. Additionally, the last phase shifter of the first Type I sequence and first phase shifter of the second Type I sequence are combined. Thus to satisfy the necessary values for $\phi_1 + \phi_0$, twice the power should be applied as when they are separated. Throughout this description, like components at the end of one sequence and the beginning of the next sequence are combined. Nevertheless, it is also possible to use the components separated. (The separated and the combined configurations are considered equivalent in the context of the invention.)

Figure 5:
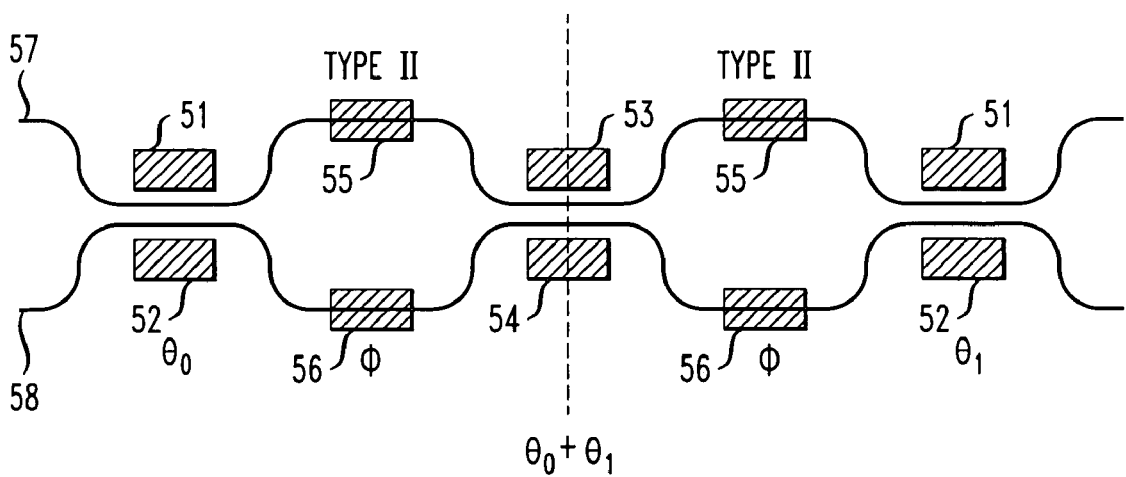

As discussed, two Type II sequences also form a half wave plate equivalent. As shown in FIG. 5, electrode control is analogous to two Type I sequences in series. That is electrodes 51 and 52 control θ for positive and negative values respectively; electrodes 53 and 54 control $\theta_0 + \theta_1$ for positive and negative values respectively; and electrodes 55 and 56 control ϕ for positive and negative values, respectively.

The sequences are connected in series to produce the desired polarization controller. A single properly controlled sequence functions as a single wave plate such as a quarter wave plate equivalent and a properly controlled pair of sequences function as a half wave plate equivalent. As previously discussed, the use in series of two general wave plates, or in the specialized example, a quarter wave plate equivalent followed by a half wave plate equivalent, allows a varying input polarization state to be converted to a single desired output polarization state. Similarly, the use of three generalized wave plates or alternatively four sequences corresponding to a quarter wave plate equivalent (one sequence) followed by a half wave plate equivalent (two sequences) followed by another quarter wave plate equivalent (one sequence) allows the conversion of a varying input polarization state to any desired output polarization state. The choice of using 1) two generalized wave plates or three sequences in the specialized case corresponding to a quarter and half wave plate in series or 2) three generalized wave plates or in the specialized case four sequences depends on the particular application. Generally, the first configuration is useful for example to convert an input signal with a constant polarization state to a desired output state or a varying input signal to a fixed polarization state, while the second configuration is useful for example to convert input signals with varying polarization to a desired output polarization state.

Figure 6:
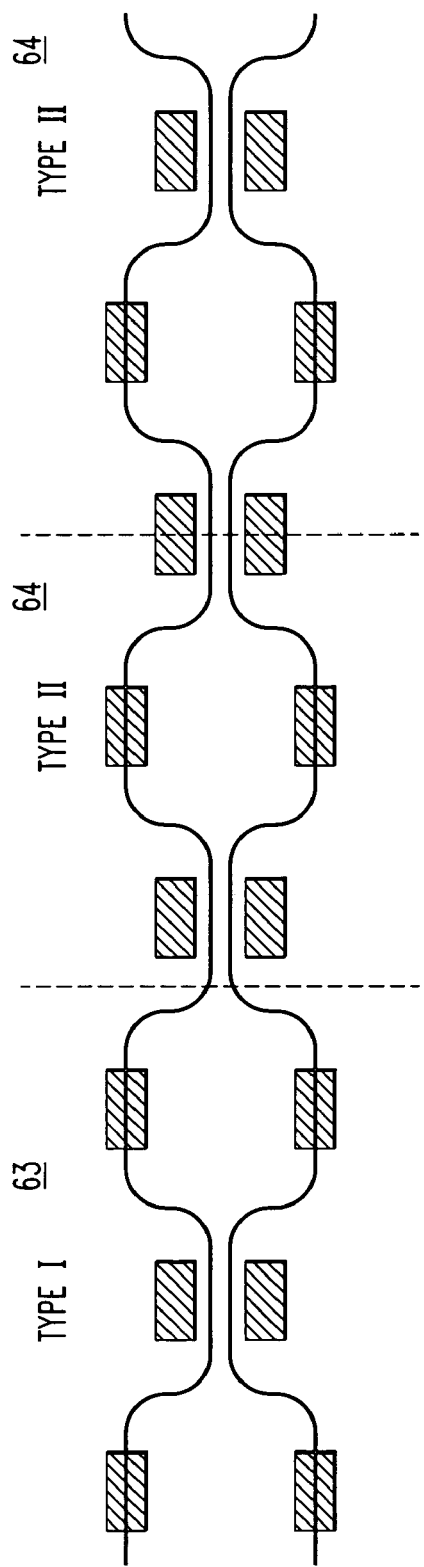

To illustrate further, a quarter wave plate followed by a half wave plate is producible with a three sequence series of all Type I or all Type II sequences. A mixture of sequence types is also useful. Therefore, illustratively, a three sequence series using one Type I and two Type II sequences is also possible. As shown in FIG. 6 the Type I sequence is indicated by 63 and the Type II sequences are denoted at 64 as delimited by dotted lines added solely as a pedagogic aid and not as a component structure. (The electrodes are included for clarity but not denominated.) Similarly, a quarter wave plate followed by a half wave plate is producible, for example, using a Type II followed by two Type I sequences, or by using three Type II sequences. In a corresponding manner a quarter wave plate followed by a half wave plate in turn followed by a quarter wave plate equivalent is formed using four sequences. Generally, four sequences of the same type are employed. However, a Type I followed by two Type II followed by a Type I, or any other combination of Type I and Type II sequences are useful.

The sequences are used in the specialized case to produce a result equivalent to a quarter wave plate. Since a half wave plate γ/2 can be replaced by two quarter wave plates γ/2, two of these sequences in a row (operated as identical quarter wave plates) are used to produce the result equivalent to a half wave plate. By controlling both ϕ and θ in each sequence, the entire device is operable without reset. To achieve the desirable attributes of reset free operation, it is advantageous to control θ and ϕ in a Type I sequence as indicated by the following equations for the specialized case:

$$\theta = \arcsin[2^{-1/2} \sin \alpha]; \phi_0 = \phi_1 = \arctan(\cos \alpha) \quad (1)$$

Where θ is the coupling strength for the coupler, and $\phi_0$ and $\phi_1$ are the phase shift for the shifter before and after the coupler, respectively.

In the second Type II sequence, the electrodes are controlled in conformance with the second equation for the specialized case:

$$\phi/2 = \arcsin[2^{-1/2} \cos \alpha]; \theta_0 = \theta_1 = \tfrac{1}{2} \arctan (\sin \alpha) \quad (2)$$

Where ϕ is the phase shift for the shifter, and $\theta_0$ and $\theta_1$ is the coupling strength for the couplers before and after the shifter, respectively.

The final output polarization state from the entire series of sequences such as the series of sequences shown in FIG. 4 is determined in the same manner as if each sequence was the corresponding quarter wave or half wave plate as described in Heismann, supra. Similarly, for the generalized wave plates the electrical parameter employed to produce the θ and ϕ required by equations (3) and (4) are determined by using a control sample. Thus as shown by the above equations, a desired output is controlled by controlling the phase shift angle and coupling strength for the components of the sequence.

Although equations 1 and 2 discussed above yield a close approximation for determining the output polarization state ultimately achieved, some variation is possible due to variations in components as fabricated in a silica substrate. A control sample is employed to determine the precise coupling strength and phase shift values necessary to yield a specific resultant polarization state of the specified embodiment.

Typically, the actual transformation achieved relative to that determined by the above formulae (2) and (3) is within 3 percent. Therefore, large corrections are generally not required.

If the input polarization state to a series of sequences is fixed and constant, then it is possible to eliminate the first component of the first sequence if it is a Type I sequence. Thus, for example, if the series of sequences receives its input signal directly from the laser generating the signal, the first component of the first sequence is not needed. Similarly, if a device receiving the signal from the last component in the last sequence of a series is not affected by the relative phase of the incoming signal, it is possible to eliminate this last component if the last sequence is Type I. For example, if a photo detector is directly after the series of sequences ending with a Type I sequence, it is possible to eliminate the last component. If a first or last component of a sequence in a series is eliminated, the sequence with the eliminated component is considered a Type I sequence even though one component is missing.

The components for each sequence are fabricated by conventional techniques as described in Kaminow and Koch, Chapter 8 supra. Generally germanium doped silica regions are employed as waveguides, with silicon dioxide upper and lower cladding used to isolate the waveguide from the heater. Typically, photolithographically defined chromium thin-film heaters are employed. The entire structure is formed on a silicon substrate with the silicon dioxide regions produced by oxidation or chemical vapor deposition. Although silicon based materials are favored, other materials such as other semiconductor materials and other dielectrics such as polymers or silicon nitride are not precluded.

We claim

1. A process for operating on an incoming optical signal having a first state of polarization to produce an outgoing optical signal having a second state of polarization different from said first state and further processing said outgoing signal, said process comprising the steps of:
   introducing said incoming signal having said first state of polarization to a series of physically coupled sequences, wherein:
   (i) said series comprises at least two Type I sequences, at least two Type II sequences or at least one each of a Type I sequence and a Type II sequence;
   (ii) each Type I sequence comprises
      two waveguiding structures,
      wherein said two waveguiding structures are arranged to form a sequence of a first variable phase shifter, a variable optical coupler, and a second variable phase shifter,
      wherein each said variable phase shifter comprises two electrodes,
      wherein said variable optical coupler is physically coupled between the two electrodes of said first variable phase shifter and the two electrodes of said second variable phase shifter,
      wherein a coupling strength of said variable optical coupler is variable in proportion to the phase shift of said first variable phase shifter and the phase shift of the second variable phase shifter, wherein the phase shift of said first variable phase shifter and the phase shift of the second variable phase shifter are substantially equal; and
   (iii) each Type II sequence comprises
      two waveguiding structures,
      wherein said two waveguiding structures are arranged to form a sequence of a first variable optical coupler, a variable phase shifter, and a second variable optical coupler,
      wherein said variable phase shifter is coupled between said two variable optical couplers,
      wherein said variable phase shifter comprises two electrodes,
      wherein the two electrodes of said variable phase shifter is physically coupled between said first variable optical coupler and said second variable optical coupler,
      wherein a phase shift of said variable phase shifter is variable in proportion to the coupling strength of said first variable optical coupler and the coupling strength of said second variable optical coupler, wherein the coupling strength of said first variable optical coupler and the coupling strength of said second variable optical coupler are substantially equal;
   controlling said sequences to operate without reset as allowed by said variable coupling strength of said variable optical coupler of said Type I sequence or said variable phase shift of said variable phase shifter of said Type II sequence,
   generating said outgoing optical signal having said second state of polarization from a combination of an output of said two waveguiding structures of said at least two Type I sequences, said at least two Type II sequences or said at least one each of a Type I sequence and a Type II sequence; and
   further processing said outgoing signal.

2. The process of claim 1 wherein said components of said sequences are formed of silicon based materials; and
   wherein said controlling step comprises controlling electric current which passes through electric heaters which are in thermal contact with said phase shifters, but are isolated from said waveguiding structures.

3. The process of claim 1 wherein said series of sequences comprises three sequences.

4. The process of claim 3 wherein said series of sequences comprises a Type I sequence followed by two Type II sequences.

5. The process of claim 3 wherein said series of sequences comprises a Type II sequence followed by two Type II sequences.

6. The process of claim 1 wherein said series of sequences comprises four sequences.

7. The process of claim 6 wherein said series comprises a Type I sequence followed by two Type II sequences followed by a Type I sequence.

8. The process of claim 6 wherein said series comprises a Type II sequence followed by two Type I sequences followed by a Type II sequence.

9. The process of claim 1 wherein said sequences operate on said optical signal as generalized wave plates.

10. The process of claim 9 wherein a series of varying input polarization states are converted to a fixed outgoing polarization state.

11. The process of claim 9 wherein a series of varying input polarization states are converted to varying output polarization states.

12. The process of claim 1 wherein said sequences operate on said incoming signals as a quarter wave plate, half wave plate, and quarter wave plate in series.

13. The process of claim 1 wherein said sequences operate on said incoming signal as a quarter wave plate and half wave plate in series.

14. The process of claim 1 wherein said series of sequences comprises two sequences operating as general wave plates, wherein said process is fully deterministic.

15. The process of claim 1 wherein said series of sequences comprises three sequences operating as general wave plates, and wherein said process is fully deterministic.

16. The process of claim 1, wherein an optical coupling occurs at a fixed amount of power in the range of 30 to 70 percent.

17. The process of claim 1, wherein the first instance of each of said waveguiding structures of at least one of said Type I sequence, or Type II sequence receives a polarization component of said incoming optical signal that is different from the polarization component received by the other waveguiding structure, wherein said polarization components are polarization components of said incoming optical signal having said first state of polarization.

* * * * *